Feb. 13, 1968      H. T. DE MAN ET AL      3,368,520
                  PRESSURE-VACUUM INDICATOR
Filed June 25, 1964                       3 Sheets-Sheet 1
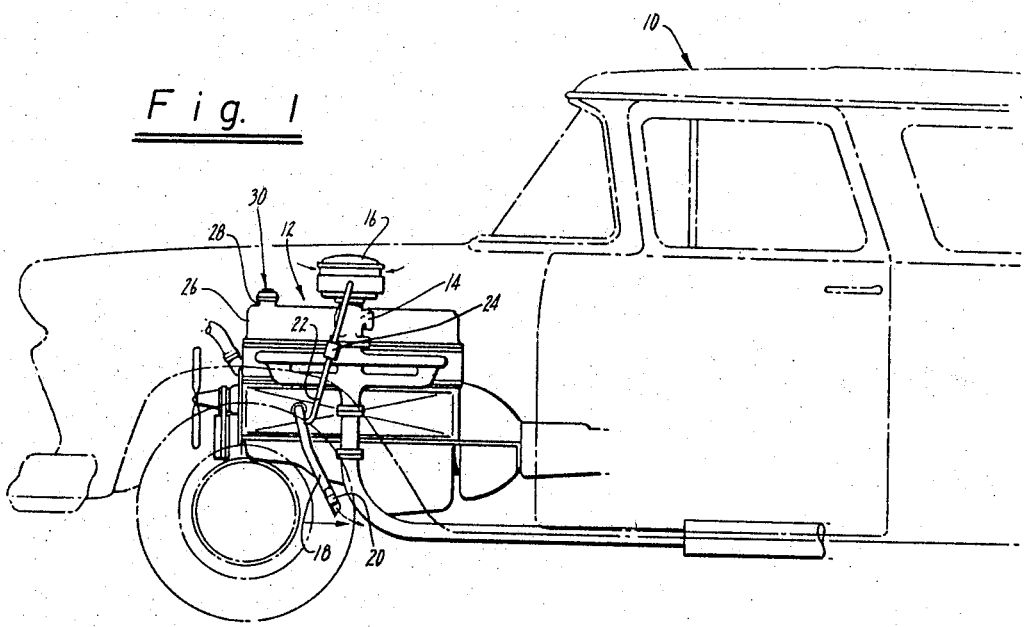
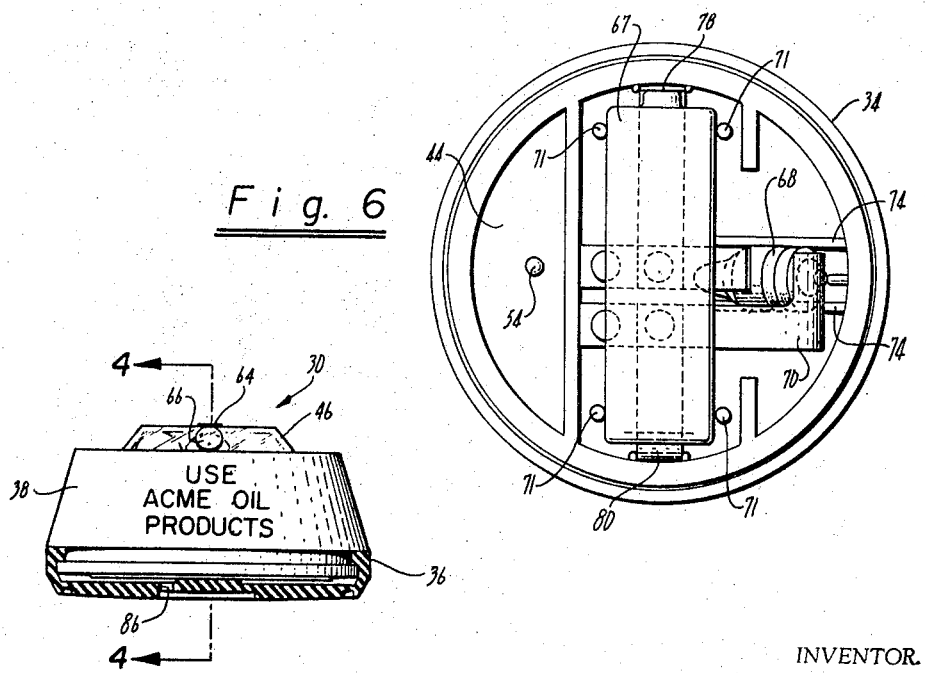
INVENTOR.
Heiko T. De Man
James A. Beaton
Attorneys

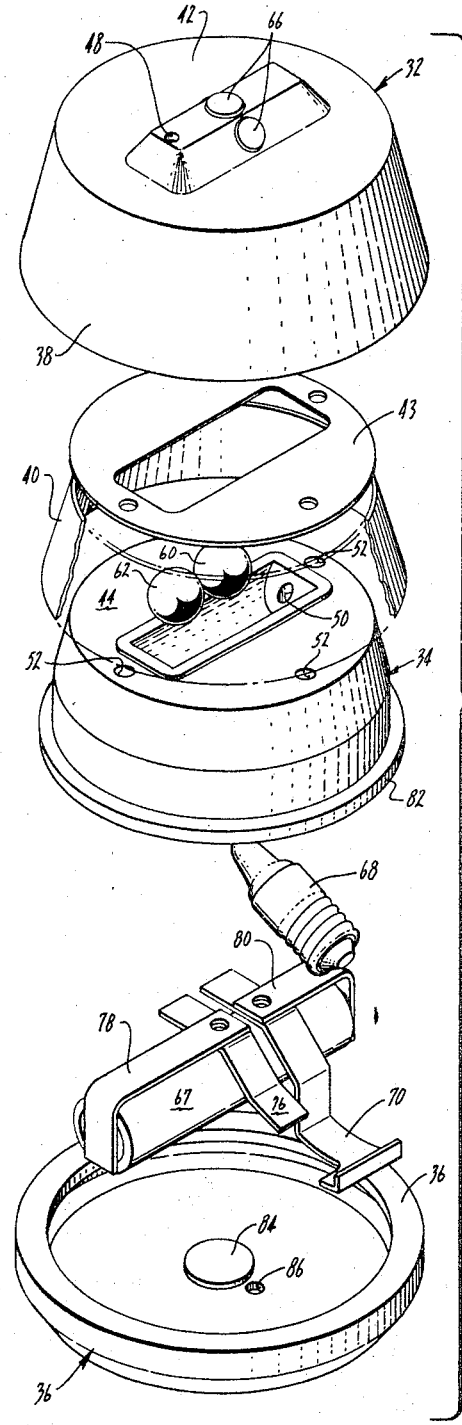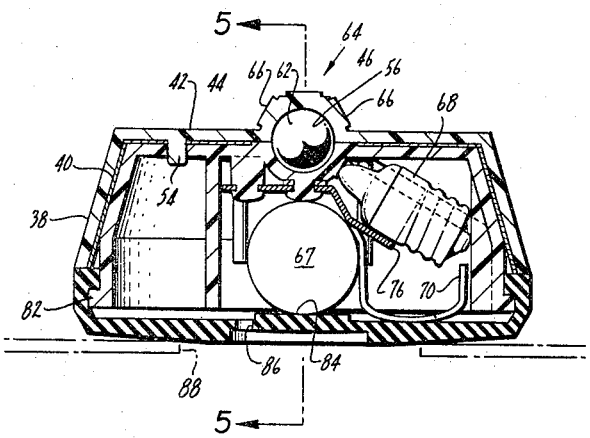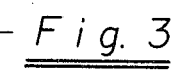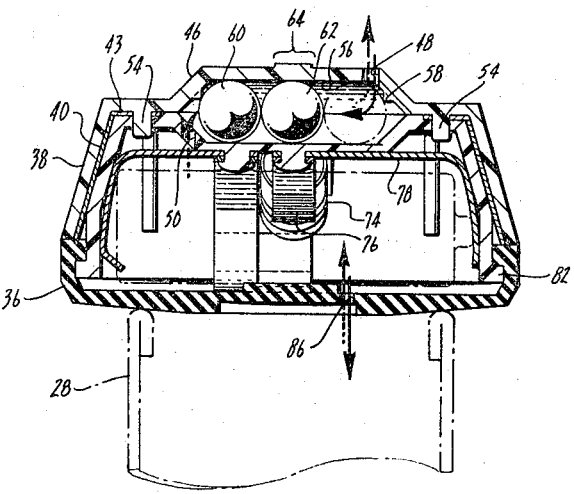
Fig. 3
Fig. 4
Fig. 5
INVENTOR.
Heiko T. De Man
James A. Beaton
Attorneys Feb. 13, 1968     H. T. DE MAN ET AL     3,368,520

PRESSURE-VACUUM INDICATOR

Filed June 25, 1964     3 Sheets-Sheet 3

INVENTOR.
Heiko T. De Man
James A. Beaton

Attorneys 3,368,520
PRESSURE-VACUUM INDICATOR
Heiko T. De Man, Orinda, and James A. Beaton, San Lorenzo, Calif., assignors to Dynamic Research Corporation, Moraga, Calif., a corporation of California
Filed June 25, 1964, Ser. No. 377,977
12 Claims. (Cl. 116—70)

The present invention relates generally to a pressure-vacuum gauge and particularly concerns a device for testing a positive crankcase ventilating system of an automobile engine.

Being that the present invention is useful when operatively associated with a particular modification to an automobile engine, it is well to understand the purpose of such modification, its physical effects upon the engine in which it is installed and the purpose the modification is to achieve. Generally, the modification herein concerned is a device for controlling crankcase emission to the atmosphere through recombustion of crankcase blowby gases.

Considering first the crankcase "blowby" gases, it is well to recall that in order to develop a maximum amount of power from combustion of gasoline, the high pressure in the combustion chamber of the piston-type engine must be confined to that chamber and not allowed to escape to the atmosphere. This is accomplished by sealing the piston in the cylinder by the use of piston rings. Since the piston rings do not form a theoretically perfect seal, some of the high pressure gases in the combustion chamber escape during both the combustion and compression strokes. These gases are called "blowby" because they have blown by the piston and piston rings into the crankcase.

During the compression stroke blowby is almost entirely air-fuel mixture. During the combustion stroke blowby gases come from that portion of the combustion chamber and cylinder volume which is immediately adjacent to the walls. This is called the "quench zone" because this portion of the air-fuel mixture is quenched by the relatively cool wall and consequently does not burn completely. It has been demonstrated that blowby from gasoline engines is mostly air-fuel mixture with a small amount of burned products.

Blowby gases are desirably purged from the crankcase in that when allowed to condensate there blowby gases will form varnish deposits, induce acid, attach and develop sludge, all of which contribute to unsatisfactory engine life and performance. A widely used system for ventilating blowby gases from the crankcase and engine passages, is to purge these gases into the atmosphere by a flow of clean fresh air. The means used includes connecting a tube to the crankcase, called a road draft tube. This tube is generally located so that the stream of air passing under the moving vehicle will draw the blowby gases out of the crankcase. Another opening is provided in communication with the crankcase to allow fresh air to enter. This opening, designated as the crankcase breather, also serves as the oil filler tube or hole and is covered with a simple air filter so that dust or dirt will not be drawn into the crankcase. The design of an oil filler hole varies among different makes, in some taking the form of a neck or tube having a diameter of about 2 inches, and in others being simply a circular opening in the valve rocker covers.

Vehicle speeds in excess of 20 m.p.h. are usually required for the road draft tube ventilating systems to be effective in operation. When so operated the blowby gases, consisting mostly of air-fuel mixtures, are discharged into the atmosphere and constitute a substantial source of uncontrolled hydrocarbon emission to the atmosphere. Well understood is that hydrocarbons in the atmosphere react in the presence of sunlight with the oxides of nitrogen to produce undesirable smog. To abate this source of smog producing hydrocarbons from crankcase blowby gases, a modification to the engine has been devised wherein the blowby gases are drawn up from the crankcase into the air intake side of the engine, either into the intake manifold or the carburetor air cleaner or both. This scheme has been termed positive crankcase ventilation.

Generally, the systems employed to control emission of blowby gases conducts the gases from the crankcase through a variable orifice valve, the opening of which may be controlled by either the intake manifold vacuum or the crankcase vacuum. Such valve is designed to have a scheduled flow rate to handle blowby gases plus an additional amount of crankcase ventilation air received through the oil filling opening, or breather cap, or from some other source. Under ideal conditions, at high manifold vacuum, the variable orifice valve is closed and a small orifice handles the flow. At 12 to 15 inches of mercury manifold vacuum the valve begins to open thus increasing the flow capacity to handle the increased blowby of the engine as the manifold vacuum increases. Being that the variable orifice valve is in communication with the crankcase it is foreseeable that the valveseats about the orifice may become encrusted with crankcase deposits rendering the valve inoperative in an open position. In this condition, when the valve is fully open, an excessive amount of ventilating air may be pulled through the crankcase and into the manifold. This tends to lean out the air-fuel mixture excessively and to reduce engine performance. Alternatively, when the valve malfunctions by remaining in the closed position excess, pressures due to blowby gas accumulation may be developed within the crankcase thereby tending to interfere with the oil distribution system and induce an outflow of blowby gases, conceiveably causing the failure of the oil seals and the consequent drawing in of excessive dirt into the engine, for example, through a loose fitting dip-stick. The purpose of the present invention is to test the operativeness of the variable orifice valve by determining the pressure or vacuum (negative pressure with respect to ambient) condition within the engine crankcase.

A general object of this invention is to provide a readily portable vacuum-pressure testing device for determining the pressure condition within an automobile engine crankcase equipped with a positive crankcase ventilation system.

Another object of the invention is to provide a device of the type described which may be mounted over an opening in an operating automobile engine, such opening being in communciation with the crankcase, to determine whether blowby gases are being discharged from such opening or whether fresh ventilating air is being drawn therethrough into the crankcase.

Still another object is to provide a testing device which will indicate for ready visual inspection to even unskilled operators thereof the operativeness of a positive crankcase ventilation system installed on an automotive-type engine.

Yet another object is to provide a testing device of the type described which is highly compact so as to fit easily in the hand or pocket, and which may be equipped with advertising indicia.

Still another object is to provide a testing device of the type described equipped with illuminating means so as to be readily observable when used under the hood of an automobile.

A further object of the invention is to provide a device for testing a positive crankcase ventilating system of an automobile engine, which device is simple in design and construction, highly practical in use, economical to manufacture, and which is flexible adapted for testing the various positive crankcase ventilating systems generally encountered.

Further features of the invention pertain to the particular arrangement of the elements of the testing device whereby the above-outlined and additional operating features as attained.

The invention, both as to its organization and method of operation, together with further objects and advantages, will best be understood by reference to the following specification taken in connection with the accompanying drawings wherein like reference numerals designate like parts throughout, in which:

FIGURE 1 is a view of a conventional 6 cylinder, overhead valve, automobile engine equipped with a positive crankcase ventilation system, the engine being shown with an associated automobile chassis depicted fragmentarily in phantom lines and a gauge of the present invention being shown operatively mounted over the engine's oil filler opening;

FIG. 2 is an elevational view, partially in section, of a first form of pressure vacuum gauge of the present invention;

FIG. 3 is an enlarged, exploded view of the gauge shown in FIG. 1;

FIG. 4 is a vertical sectional view taken generally in the direction of the arrows along the line 4—4 of FIG. 2, but generally in the scale of FIG. 3;

FIG. 5 is a vertical sectional view taken generally in the direction of the arrows along the lines 5—5 of FIG. 4;

FIG. 6 is an inverted plan view of the inner casing member of the gauge of FIG. 2;

Figure 7:
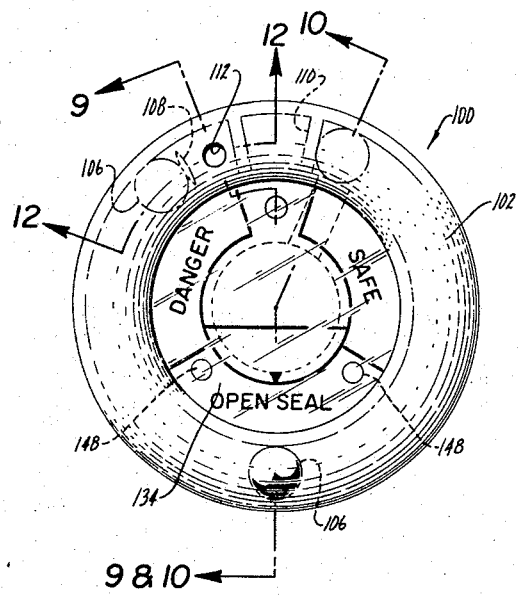
FIG. 7 is a plan view of a second form of vacuum-pressure gauge of the present invention.
Figure 8:
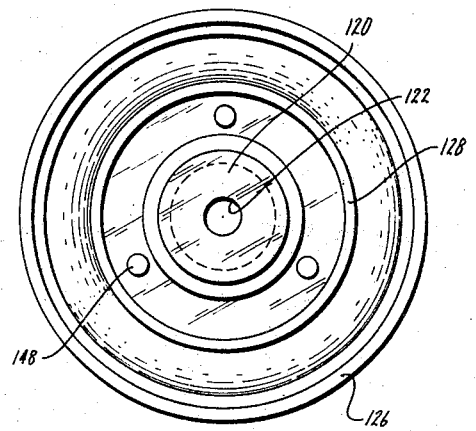
FIG. 8 is an inverted plan view with a bottom closure removed of the gauge shown in FIG. 7.

Referring now to FIG. 1 of the drawings, there is shown in phantom lines an automobile 10 having mounted therein a 6 cylinder gasoline engine 12 shown in full line. The engine 12 is provided with a conventional downdraft carburetor 14 equipped with an air cleaner 16, the engine 12 being further equipped with a conventional road-draft tube 18 which, in this instance, is fitted with an air-tight plug 20, it being understood that the road-draft tube 18 is in communication with the crankcase of the engine 12.

Were it not for the plug 20 crankcase blowby gases would be withdrawn through the road-draft tube 18 and discharged to the atmosphere. However, the engine 12 being equipped with a positive crankcase ventilation system, the tube 18 is in communication with the intake side of the carburetor 14 by means of a bypass pipe 22 having mounted therein a variable-orifice, one-way valve 24. The direction of flow through the valve 24, it is to be understood, is from the draft tube 18 towards the carburetor 14, which flow is induced by the pressure differential between the crankcase and the intake manifold of the engine 12.

Being of the overhead valve variety, the engine 12 is equipped with a rocker cover 26 including an oil-filling opening 28, there being shown mounted thereon, in operative position, a pressure-vacuum gauge generally designated 30 made in accordance with and embodying the principles of the present invention. The purpose of the gauge 30, broadly speaking, is to measure the pressure condition within the crankcase of the engine 12 when the engine is operating so as to determine whether the one-way valve 24 is functioning properly.

Referring now to FIGS. 2–6, a first form of the invention is there shown having the general shape of a shallow, inverted cup of a size comfortably to fit within the palm of the hand and so constructed along the bottom portions thereof to cover sealingly the oil filter opening 29 of the automobile engine 12. The first form of pressure-vacuum gauge 30 includes an outer casing 32 adapted to receive nestably therein an inner casing 34 upon the lower margin of which is mounted a flexible bottom closure 36.

The outer casing 32 includes a side wall 38 adapted to accommodate advertising indicia as shown in FIG. 2 so that the instant gauge device 30 may serve an important subsidiary function of carrying an advertiser's message to the user of the gauge 30, usually the service station attendant. In the present embodiment the advertising indicia is accommodated on the gauge 30 by forming the side wall 38 of transparent material and fitting therein a ribbon or band of sheet material 40 which carries the printed matter, the ribbon 40 fitting between the nesting portions of the outer 32 and inner 34 casings, best shown in FIGS. 3–5.

As shown in the drawings the inner 34 and outer 32 casings when in the nested position present to one another confronting, substantially flat top panels, 42 and 44 respectively.

An indicator card 43 is sandwiched between the panels to indicate through the transparent portion of the panel 42 the directions for using the gauge 30. Centered on the panels 42, 44 is a housing 46 defined by a complementary portion protruding outwardly of the panel 42 and inwardly of the panel 44 of the inner casing 34. As may be seen from FIG. 5 the housing 46 adjacent the right end thereof is equipped with a first aperture 48 in the outer casing 32; and at the left end thereof is equipped with the second aperture 40 in the inner casing 34. In the assembly of the outer 32 and inner 34 casing to insure that the first 48 and second 50 apertures are disposed in proper relationship to each other registering means are provided in the form of three holes 52 in the wall 44 of the outer casing 32, best shown in FIG. 3. Each hole 52 receives therein a peg 54 depending from the underside of the top wall 42 of the outer casing 32 which peg also passes through a hole 55 in the indicator card 43 so that the indicator card 43, outer 32 and inner 34 casings may be assembled together in only the one proper manner.

Considering further the housing 46, it will be seen from FIGS. 4 and 5 that it defines a chamber 56 substantially circular in lateral section (shown in FIG. 4) and linear in longitudinal section (shown in FIG. 5). Between spaced abutments 58 adjacent the first and second apertures 48, 50 there are disposed within the chamber 56 rollable indicator means taking the form in this embodiment of a pair of spheres 60 and 62. Preferable the spheres 60, 62 carry a differing indicia, an exemplification being that the sphere 60 is formed of light transmissible material reddish in hue while the sphere 62 of similar such material but greenish in hue. Intermediate the spaced abutments 58, the outer wall of the housing 46 is provided with an indicating zone preferably of transparent material so that the position of the spheres 60, 62 with respect to the zone 64 may be easily observed. To further emphasize the indicating zone 64 integral lens 66 may be formed in the walls of the housing 46 at the top and two sides thereof for easy observation of the indicator means within the chamber 56. Except for the indicating zone 64, the exterior of the housing 46 may be opaque or substantially less transparent than the zone 64 so that indicating zone 64 may be more readily identified.

To be noted is that the abutments 58 are spaced apart a distance equal to the sum of the diameters of the spheres 60, 62 and the width of the indicating zone 64; or alternatively equal to the product of three times the diameter of the spheres 60 when such are of equal size as shown in FIG. 5.

Illuminating means are mounted within the inner casing 34 so as to project a beam of light into the indicating zone 64 for easy identification of the position of the indicating spheres or balls 60, 62. More specifically, the illuminating means include a pen-light dry cell 67, a bulb 68 and switch means 70, clearly shown in FIGS. 3 and 4. As shown in the inverted plan view of FIG. 6, the dry cell 67 is disposed across the diameter of the inner casing 34 and is maintained in this relationship by four pegs 71 depending from the top wall 44. The bulb 68 is arranged transversely of the cell 67 in an upperwardly inclined position (shown best in FIG. 4) wherein the tip of the bulb 68 is in proximity with an integral lens 72 formed in the indicating zone 64 of the housing 46. The bulb 68 is supported in this position by a pair of spaced ribs 74 (shown in FIG. 6) molded from integral with the sidewall of the inner casing 34 and by a metal contact leaf 76 depending from the top wall 44 of the casing 34, best shown in FIG. 4. The leaf 76 is in electrical communication with a first bar 78 which engages at its outer end the positive terminal of the cell 67.

The negative terminal of the dry cell 67 is engaged by a second metal bar 80 secured at its inner end to a stud integral of the inner casing 34. The switch 70, having the form of a cantilevering arm, is connected to the second bar 80 and is arranged to lie below the lowest extent of the cell 67 and to extend laterally to a point below the central contact of the bulb 68, as shown best in FIGS. 3 and 4.

When the outer 32 and inner 34 casing are in assembled position with the illuminating means including the battery 67 and bulb 68 mounted therein, the pliable bottom closure 36 is mounted to the lower margin of the inner casing 34 so as to engage an outwardly extending collar 82 thereof. It will be noted that the bottom closure 36 has a central disc portion 84 engageable with the dry cell 67. Radially of the disc 84 the pliable closure 36 is provided with an opening 86 permitting air or vapor passage to and from the inner casing 34 and thence to and from the chamber 56 through the second aperture 50 and thence to and from the atmosphere through the first aperture 48.

It will be noted that the switch arm 70 lays against the bottom closure 36 so that inner deflection of the closure 36 moves the arm 70 into electrical contact with the center terminal of the bulb 68 to complete the lighting circuit from the dry cell 67. Preferably the bottom closure 36 is formed of a rubber-like material so as to sealingly engage about the oil filler opening of a modern automobile engine. In FIG. 4 there is shown in phantom lines a flat rocker cover having an opening 88 therein whereas in FIG. 5 the conventional neck type oil filler is shown at 28.

In operation the pressure-vacuum gauge 30 may be fitted to cover either type of oil filler opening 28 or 88 and when depressed thereon for sealing engagement will cause inward deflection of the closure 36 whereby to bring the contact arm 70 into engagement with the bulb 68 to complete the illuminating circuit and to project a beam of light into the indicating zone 64 of the housing 46. Assuming the variable-orifice valve 24 to be in operative condition thereby to create a partial vacuum in the engine crankcase, when the engine is operating to produce manifold vacuum a column of air will be swept into the gauge 30 from the atmosphere through the first aperture 48 through the chamber 56 then through the second aperture 50 and through the opening 86 into the oil filler hole towards the crankcase. This movement of air will urge the rollable indicator means 60, 62 towards the left as shown in FIG. 5 to present the green ball or sphere 62 to the indicating zone 64 and in the path of the light beam. This will indicate to the operator with reference to the indicator card 43 that the valve 24 is in inoperative condition.

Assuming a condition wherein the one-way valve 24 is defective and in a closed position wherein a positive pressure with respect to ambient will be created in the engine crankcase, a vapor column will move from the crankcase through the opening 86 of the closure 36 into the chamber 56 through the second aperture 50 and outwards therefrom through the first aperture 48. This movement of vapor will urge the two balls 60, 62 towards the right as viewed in FIG. 5 thereby presenting the red ball 60 to the indicating zone 64. This will indicate to the operator with reference to the indicia (not shown) on the indicator card 43 that the valve 24 is in a defective condition needing replacement or repair.

There is shown in FIGS. 7–12 a pressure-vacuum gauge designated generally 100 made in accordance with and embodying a second form of the present invention. The gauge 100 is generally circular in outline and has the form of an inverted shallow cup. At the top, the gauge 100 is configured into a raised toroidal housing 102 inclosing an arcuate chamber 104 having a generally circular radial cross-section, shown best in FIGS. 9 and 10.

The housing 102 is transparent, being formed of suitable moldable plastic materials, well known in the art, so that the contents of the chamber 104 are clearly visible through the housing walls. More particularly a ball 106 is rollably disposed in the chamber 104 for movements between abutment members adjacent the chamber's ends. A first abutment is provided by the lug 108 projecting into the chamber 104 from the ceiling thereof, shown best in FIG. 12. A second abutment at the opposite end of the chamber 104 is provided by a bulkhead 110, shown best in FIG. 11. Thus the ball 106 is rollable along the arcuate chamber 104 between extreme positions established by the lug 108 and the bulkhead 110.

Figure 9:
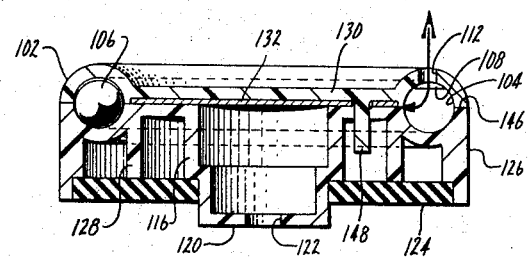
FIG. 9 is a vertical sectional view taken generally in the direction of the arrows along the lines 9—9 of FIG. 7.
Figure 10:
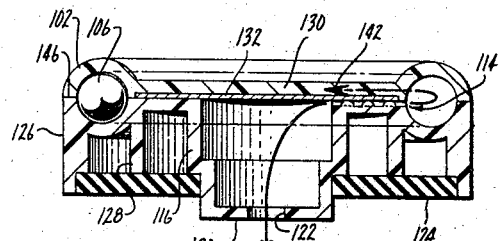
FIG. 10 is a vertical sectional view taken generally in the direction of the arrows along the line 9–10 of FIG. 7.
Figure 11:
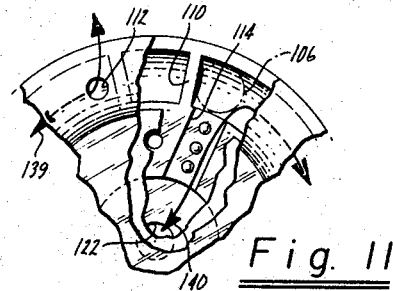
FIG. 11 is a fragmentary plan view, partially broken away, of the eleven o'clock-two o'clock segment of the gauge shown in FIG. 7.
Figure 12:
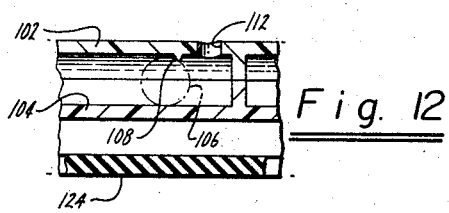
FIG. 12 is a fragmentary, vertical section view taken generally in the direction of the arrows along the line 12—12 of FIG. 7.

Adjacent each abutment 108, 110 there is disposed in the housing 102 an opening. More specifically a first opening 112 is arranged in the top of the housing 102 adjacent the first abutment 108 and beyond the path of ball travel, shown best in FIG. 12. A second opening or channel 114 is arranged in the inner side-wall of the housing 102 adjacent the bulkhead 110 to lead radially of the chamber 104 into a hollow central collar 116 of the gauge 100, as shown in FIGS. 9–11. The central collar 116 is inwardly stepped to form a neck 118 which terminates in a bottom wall 120 having a central opening 122 permitting access an egress of vapor from the gauge 100 through the channel 114 into the chamber 104 and from there through the aperture 112 to the atmosphere.

Surrounding the neck 118 and opening 122 is a bottom closure member 124 formed of rubber-like material adapted to seal well with the neck of an oil filter cap when the gauge 100 is placed in operative position. More particularly, the closure member 122 is of annular configuration and seats along its inner periphery on the shoulder between the collar 116 and neck 118 and on its outer periphery seats in a recessed portion of a circular skirt 126 depending from the housing 102, shown best in FIGS. 9 and 10. A support ring 128 depending from the inner periphery of the housing 102 and engages the closure 124 so as to provide intermediate support between its inner and outer peripheries. As shown in FIGS. 9 and 10 the neck 118 projects outwardly of the bottom closure 124 a short distance.

Considering now FIGS. 7, 9 and 10, a transparent circular panel 130 is arranged integral with the inner periphery of the housing 102. Below the panel 130 is disposed an indicator card 132 showing visibly through the panel 130 and defining an indicating zone 134. The zone 134 is segregated into three areas, the first carrying the indicia "safe," the second bearing "open seal," and the third "danger," as shown in FIG. 7. When the gauge 100 is placed over an oil filling opening (not shown) but before the bottom closure 128 has formed an air-tight seal therewith, the ball 106 will assume the position shown in FIG. 7 for the reason that the vapor currents traversing the chamber 104 are generally of insufficient force to propel the ball 106 to either the left or right into the "danger" or "safe" zones. Should the oneway valve 24 be in proper operative condition wherein air is drawn in through the oil filler opening, with the closure 124 in sealing engagement, a column of air will be drawn into the chamber 104 through the opening 112, indicated by the arrow 138 as shown in FIG. 11. The air column will propel the ball 106 to the position shown in phantom lines in FIG. 11 at which point the air column will escape past the ball 106 through the horizontal pasageway 114 as indicated by the arrow 140, towards the central opening 122. At this point the ball 106 engages the abutment 110 and indicates with reference to the card 132 a "safe" condition.

Should the oneway valve of the crankcase ventilation system be stuck in a closed position a positive pressure created by blowby gases will be established in the crankcase. Thus a column of vapor will emanate through the oil filter opening into the central opening 122 in the direction of the arrow 142, as shown in FIG. 10. This column of vapor will propel the ball 106 in a counter clockwise direction along the channel 106 to the position as shown in phantom lines at the upper left in FIG. 7 and the ball 106 will engage the first abutment 108. At this point the vapor will escape between the ball 106 and chamber walls through the opening 112 to the atmosphere. In this condition with reference to the card 132 the indicator ball 106 signifies "danger" regarding the condition of the crankcase ventilation device.

The pressure vacuum gauge 100 may be constructed of readily moldable plastic material and is preferably formed in two portions. The top portion will include those parts of the gauge 100 disposed above the parting line 146, shown in FIGS. 9 and 10, the orienting pegs 148 excluded. The lower or second part of the gauge 100 includes those portions below the line 140.

While there has been described what is at present considered to be the preferred embodiments of the invention, it will be understood that various modifications may be made therein and it is intended to cover in the appended claims all such modifications that fall within the true spirit and scope of the invention.

What is claimed is:

1. A gauge for indicating the direction of gas flow with respect to the ventilation of a crankcase in an automobile engine, comprising: a housing defining an enclosed channel and having opposed light-transmissive wall portions defining an indicating zone along the channel; illuminating means arranged to selectively project a beam of light through said indicating zone; said housing having vapor admitting apertures adjacent each end of said channel; and first and second light-conductive indicator means disposed in said channel intermediate said apertures, said indicator means being movable to a first position in response to a positive pressure condition within said channel wherein said first light-conductive indicator means is disposed in the path of said light beam, and to a second position in response to a negative pressure within said channel wherein said second light-conductive indicator means is disposed in the path of said light beam, said pressure conditions being attributable to the direction of vapor passage through said vapor apertures.

2. The combination set forth in claim 1 wherein said light-transmissive wall portions of said indicating zone are equipped with integral lens means to concentrate and emphasize for indicating purposes said light beam from said illuminating means.

3. The combination set forth in claim 1 wherein said illuminating means includes a bulb confronting said indicating zone; a battery; and switch means in electrical communication with said bulb and battery for selectively illuminating said bulb from said battery.

4. The combination set forth in claim 1 wherein said first and second indicator means are light transmissible balls, each having a visually observable indicia recognizably similar to that of the other.

5. In a pressure-vacuum gauge, the combination comprising:

a housing defining a linear, enclosed channel and having a transparent indicating zone along said channel, said housing having a vapor-admitting aperture adjacent each end of said channel; and first and second ball indicators disposed in said channel intermediate said apertures and being dimensioned generally complementary to the lateral cross-section of such channel for rolling movements therein;

said ball indicators being movable to a first position in response to a positive pressure condition within said channel wherein said first ball is disposed in said indicating zone, and to a second position in response to a negative pressure condition within said channel wherein said second ball is disposed in said indicating zone, such pressure conditions being attributable to the direction of vapor passage through said vapor apertures.

6. The pressure-vacuum gauge defined in claim 5 wherein spaced abutments are arranged in said channel a distance apart equal to the sum of the diameters of said first and second ball indicators and the length of said indicating zone, said abutments defining the respective extremes of said positions.

7. In a pressure-vacuum gauge for testing a positive crankcase ventilating system of an automobile engine the combination comprising:

a generally circular casing including a top-wall;

an inner panel mounted within said casing closely adjacent said top-wall;

said inner panel and said top-wall being configured to define an enclosed channel;

the configurated portion of said wall and panel having a spaced pair of apertures therein along said channel and a light transmissive zone therebetween;

a first and second light transmissive ball indicators disposed in said channel intermediate said apertures for rolling movement across said zone;

a deflectable, bottom closure having a vapor opening therein and defining with said casing a housing compartment; and means in said compartment for projecting a beam of light through said light transmissive zone and ball indicators upon inward deflection of said bottom closure.

8. The pressure-vacuum gauge defined in claim 7 where said means includes a light source confronting said light transmissive zone, a battery, and switch means in electrical communication with said battery and light source, said switch means including an arm movable with said bottom closure to illuminate said light source in response to said inward deflection of said bottom closure.

9. A device for testing a positive crankcase ventilating system of an automobile engine and for accommodating advertising indicia, the combination comprising:

a transparent outer casing including an outer top-wall having outer side-walls depending therefrom;

an inner casing nestable within said outer casing and including an inner top-wall having inner-walls depending therefrom;

a member of sheet material having advertising indicia thereon interposed between said side-walls of said transparent outer casing and said inner casing;

said inner and outer top-walls being configurated to define an enclosed channel;

the configurated portion of said top-walls having a spaced pair of apertures therein along said channel and a light transmissive zone therebetween;

first and second light transmissive ball indicators disposed in said channel intermediate said apertures for rolling movements across said zone;

a deflectable bottom closure having a vapor opening therein mounted to define a housing compartment within said inner casing; and means in said compartment for projecting a beam of light through said light transmissive zone and ball indicators upon inward deflection of said bottom closure.

10. The device set forth in claim 9 wherein said bottom closure is formed of a rubber-like material to sealingly engage an oil filling opening of an automobile engine.

11. The device set forth in claim 9 wherein said configurated portion of said top-walls includes a central indicating zone, abutment means arranged in said channel on opposite sides of said zone and spaced apart a distance equal to the sum of the diameters of said first and second ball indicators and the length of said zone.

12. The device set forth in claim 9 wherein said configurated portion of said top-walls is equipped with integral lens means to concentrate and emphasize for indicating purposes said light beam.

No references cited.

LOUIS J. CAPOZI, *Primary Examiner.*